July 9, 1946. S. P. STEIN 2,403,564
WIND-OPERATED DEVICE FOR GENERATING ELECTRICITY
Filed June 8, 1945 2 Sheets-Sheet 1
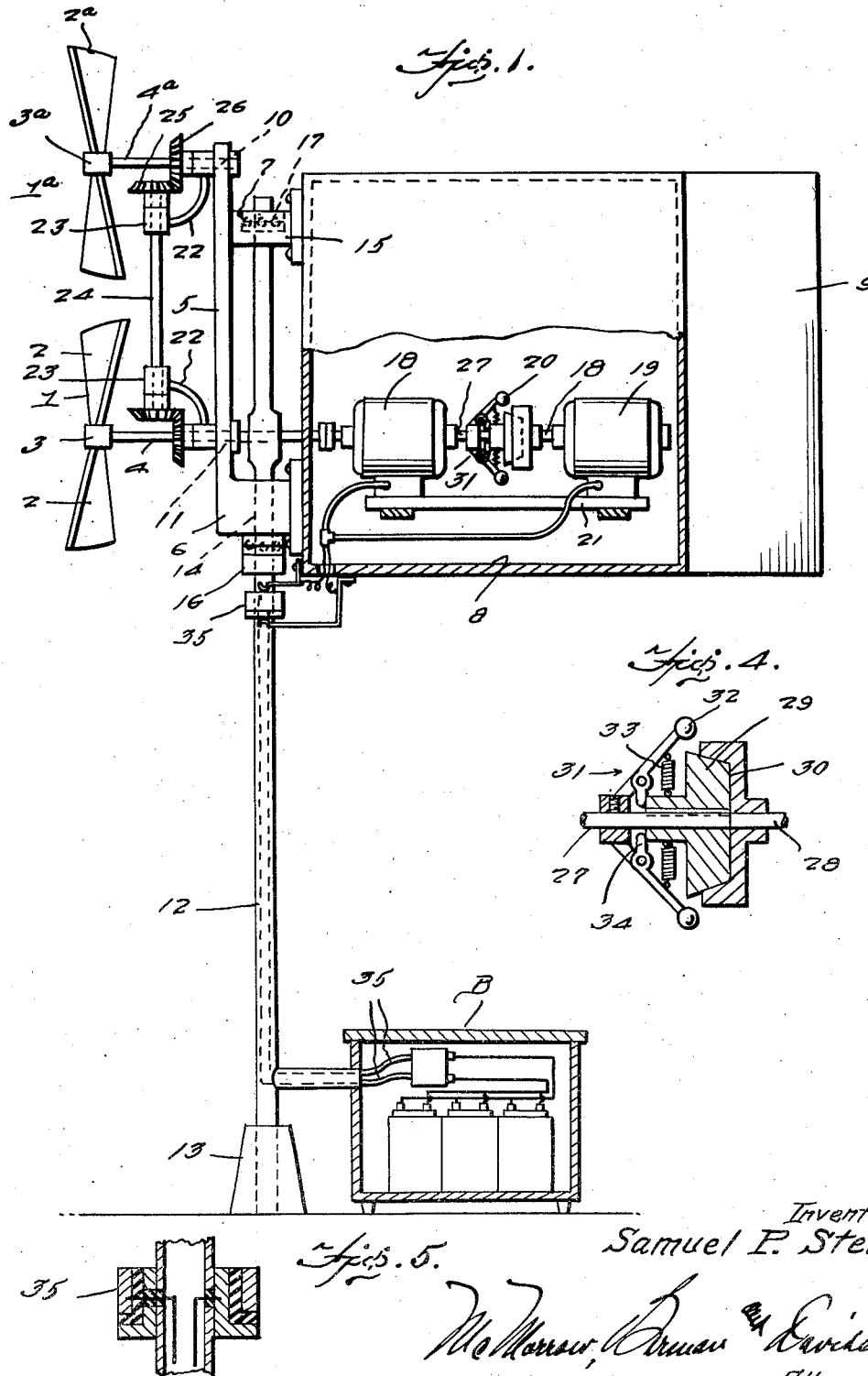
Inventor
Samuel P. Stein
Attorneys

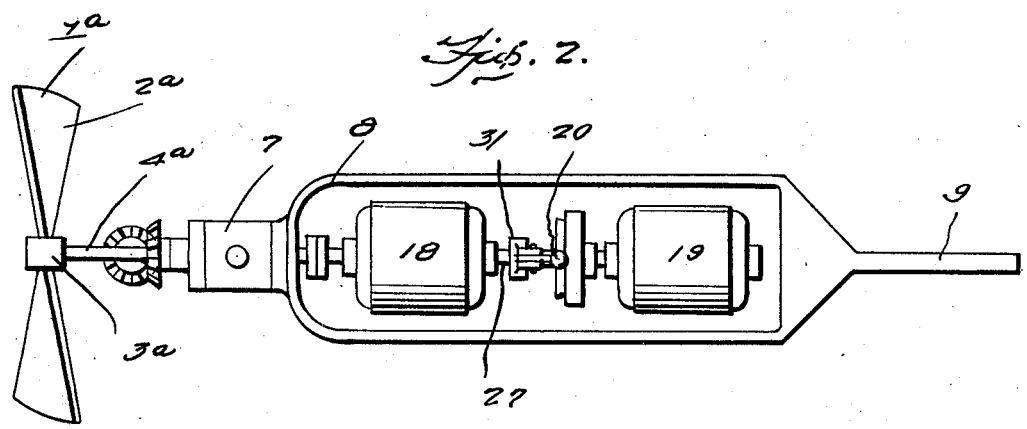

Patented July 9, 1946

2,403,564

UNITED STATES PATENT OFFICE 2,403,564

WIND-OPERATED DEVICE FOR GENERATING ELECTRICITY

Samuel P. Stein, Ocean Grove, N. J.

Application June 8, 1945, Serial No. 598,323

1 Claim. (Cl. 290—44)

The present invention relates to wind-operated devices for generating electricity and particularly to that type employing the general principles of a wind-mill.

A primary object of the invention is to provide a device of the foregoing type of simpler and more compact construction than any in the prior art.

Another object is to provide a wind-operated device for generating electricity which is more adaptable to the varying conditions of wind pressure obtaining in different localities.

A further object is to provide a wind-operated device for use in connection with electric generators which will operate them at approximately constant speed.

Still another object is to provide a device of this type which does not require the complicated operating mechanisms generally considered necessary in prior devices.

The inventive idea or concept is capable of being embodied in various mechanical forms, but one will be described in detail for the purpose of illustrating the invention.

With the foregoing and other objects and advantages in view my invention consists of the novel construction and arrangement of parts herein disclosed and claimed.

In the accompanying drawings illustrating the invention,

Figure 1 is a side elevation with the housings for the generators and storage battery shown in section.

Figure 2 is a top plan view.

Figure 3 is a front elevation of the upper part of the device.

Figure 4 is a longitudinal sectional view of the governor-controlled clutch.

Figure 5 is a sectional view of the current takeoff.

Similar numerals are used in the description and drawings to designate the same parts of construction.

The activating elements 1 and 1a are shown in the conventional form used for wind-mills and comprise the radially-disposed blades 2 and 2a which, under the influence of air currents, cause the elements 1 and 1a to rotate. The blades are mounted on hubs 3 and 3a and the hubs are fixedly secured to shafts 4 and 4a, the latter being a stub-shaft. A bracket 5 having laterally-projecting arms 6 and 7 is mounted vertically on the front of a housing 8 forming part of the vane 9. The bracket is provided with upper and lower bearings 10 and 11 for the reception of the shafts 4 and 4a. A vertical, tubular standard 12, which is mounted in a suitable base 13 on the ground, projects through the registering openings 14 and 15 in the arms 6 and 7 of the bracket and supports the parts with which the bracket is assembled. Ball-bearings 16 and 17 are provided for the openings 14 and 15 to facilitate the rotation of bracket 5 and attached parts around the tubular standard 12 which is non-rotatable.

The shaft 4 extends longitudinally through the bracket and into the generator-housing 8 through an opening in the front wall thereof. Here it is coupled to the shaft of the generator 18. The shaft of this generator is coupled to the shaft of the second generator 19 by means of a governor and clutch 20 to be more particularly described hereafter. These generators are mounted on a suitable base 21 provided within the housing 8. The housing is shown open at its top but the same may be closed in if desired.

Mounted freely on shafts 4 and 4a are the arms 22 which are provided with the vertically-disposed bearings 23 for the reception of a rotatable vertical shaft 24. Attached to each end of this shaft is a bevel-gear 25 adapted to mesh with the bevel gears 26 disposed at right angles thereto and secured on the shafts 4 and 4a to rotate therewith. The arms 22 are secured immovably to the bracket 5. This construction is designed to augment the power generated by the rotation of element 1 with that from the rotation of element 1a through the train of gears above described. In the embodiment of my invention shown here the shaft 27 of the first generator 18 is positioned in alinement with shaft 28 of the second generator 19 and is coupled thereto through the medium of the generator-controlled clutch 20. An ordinary or conventional type of clutch, comprising the members 29 and 30, adapted for frictional engagement, is employed. The member 29 is keyed to the extremity of shaft 27 while the member 30 is keyed or otherwise attached to the contiguous extremity of the shaft 28 of the generator 19. Attached to the shaft 27 of the generator 18 is a centrifugal type of governor 31 comprising a collar attached to the shaft and adapted to rotate therewith and the weighted arms which are pivotally connected to said collar. These arms are normally retracted by means of the coiled springs 33, one end of which is connected to the hub of clutch-member 29 and the other end to the said arms between the weights and pivotal points. Fingers 34, designed to engage with and operate on the end of the hub of clutch-element 29 when the shaft 27 has attained a maximum speed of rotation, are formed on the inner ends of the arms and at angle thereto. At the bend between arm and finger, the arm is pivotally mounted on a short arm projecting from the collar of the governor. From the foregoing description it will be obvious that the members of the clutch will be thrown into frictional engagement and the shaft of the second generator will be caused to rotate at the speed of the shaft of the first generator and that the clutch will automatically disengage when the wind pressure on elements 1 and 1a diminishes with a consequent drop in the rotary speed of the main shaft 4. This construction for controlling the speed of wind-mills over a wide range of variable wind pressures is essential since generators operate efficiently only at approximately constant speed. Each power unit includes a group of two or more generators each provided with the automatic clutch above described and they may be arranged in tandem, as shown. The first generator of the group is designed to operate at full load under light wind pressure. When the force of the wind increases and thereby tends to drive the main shaft 4 above the normal speed, the governor actuates the clutch as explained and connects up the second generator of the group, thus putting more load on the windmills and keeping the speed of the main shaft down to normal.

By suitable wiring the generators are electrically connected with storage batteries B located on the ground from whence the current is distributed as needed. The wiring 35 is conducted from the generators to the storage batteries through the tubular standard 12. By means of proper conventional controls the electricity thus generated and stored may also be delivered directly to a distribution network. Switches for cutting in the generators to the main feed circuit, when running at circuit voltage, can be actuated by the same or independent governors.

What I claim as new and desire to secure by Letters Patent of the United States is:

A wind-operated device for generating electricity comprising a plurality of wind-operated members mounted on rotatable horizontal and parallel shafts, a vertical shaft connecting said shafts, a bracket for journalling said shafts, a ground-supported post for journalling said bracket, a frame supported by said bracket and forming at one end a wind-controlled vane, a generator supported by the frame and driven by one of the said first shafts, a second generator supported by the frame in alignment with said first generator and including a shaft coaxial with the shaft of the first generator, a clutch coacting with the adjacent ends of the generator shafts and normally urged to disconnected position, a governor responsive to the speed of said first generator shaft for operating said clutch when the speed approaches the limit of the load capacity of said first generator, and a storage battery anchored to the post and connected to said generators by conductors within said posts.

SAMUEL P. STEIN.